(12) United States Patent
Tran et al.

(10) Patent No.: US 6,944,324 B2
(45) Date of Patent: Sep. 13, 2005

(54) MACHINE VISION-BASED SINGULATION VERIFICATION SYSTEM AND METHOD

(75) Inventors: Don Tran, Delray Beach, FL (US); George W. Schurr, Ft. Thomas, KY (US)

(73) Assignee: Robotic Vision Systems, Inc., Canton, MA (US)

( * ) Notice: Subject to any disclaimer, the term of this patent is extended or adjusted under 35 U.S.C. 154(b) by 587 days.

(21) Appl. No.: 09/768,385

(22) Filed: Jan. 24, 2001

(65) Prior Publication Data

US 2002/0118873 A1 Aug. 29, 2002

Related U.S. Application Data (60) Provisional application No. 60/178,037, filed on Jan. 24, 2000.

(51) Int. Cl.[7] .................................................. G06K 9/00
(52) U.S. Cl. ....................................... 382/143; 382/101
(58) Field of Search ................................. 382/141, 143, 382/101; 209/584, 900; 705/401; 348/159

(56) References Cited

U.S. PATENT DOCUMENTS

| | | | | |
|---|---|---|---|---|
| 3,692,980 A | * | 9/1972 | Getker et al. | 377/6 |
| 3,868,478 A | * | 2/1975 | Zeenkov | 348/159 |
| 5,966,457 A | * | 10/1999 | Lemelson | 382/141 |

* cited by examiner

Primary Examiner—Vikkram Bali
(74) Attorney, Agent, or Firm—Bourque & Associates (57) ABSTRACT

A system and method for detecting multiple object conditions, such as side-by-side and overlapped objects, such as packages, on a conveyor. The system includes at least one machine vision system including at least one machine vision camera, at least one illumination subsystem and at least one machine vision computer. The illumination subsystem(s) is configured to illuminate a plurality of objects as they are conveyed past at least one field of view at an inspection station along a conveyor belt. Each machine vision camera is positioned to capture one or more images of the objects as the objects are conveyed past the field of view(s). Each machine vision computer is programmed to detect the presence of multiple object conditions by detecting and counting the number of edges appearing in an image of an object captured by one of the machine vision cameras. The method illuminates at least one object as it passes through the field of view, at which time at least one image of the object is captured. Next, each captured image is processed using a machine vision computer by windowing each parcel using a Region of Interest (ROI) and counting the number of edges appearing within the ROI. The presence of other than a single package condition is determined if the number of edges exceeds four.

14 Claims, 7 Drawing Sheets

MACHINE VISION-BASED SINGULATION VERIFICATION SYSTEM AND METHOD

RELATED APPLICATIONS

This application claims benefit of U.S. Provisional Application Ser. No. 60/178,037 filed Jan. 24, 2000, fully incorporated herein by reference.

FIELD OF THE INVENTION

The present invention relates to inspection systems and methods and in particular, to a system and method for inspecting packages on a conveyor belt and detecting the presence of overlapped and/or side-by-side packages.

BACKGROUND OF THE INVENTION

Digital data and signal processing techniques and vision system technology have tremendously advanced the ability to use computers as data processing systems to accomplish sophisticated inspection procedures without human intervention. Almost every type of product can benefit from low cost, high precision, high-speed automated inspection technology derived from these new digital data and signal processing techniques.

One such situation that has greatly benefited from high-speed inspection technology involves material handling systems. For example, packages or parcels traveling on a conveyor belt must be spaced apart for individual tracking and tagging purposes. In this way, automated systems can duplicate tasks that were previously performed by humans, such as sorting parcels according to destination locations. However, in order for such automated material handling apparatus to operate efficiently and effectively, parcels must be aligned and spaced apart from each other as they travel on conveyor systems. If, on the other hand, parcels are side-by-side or overlap, then it is quite possible that one or more parcels will be erroneously sorted, which will result in at least one parcel arriving at an incorrect destination. As can be appreciated, such situations incur additional costs in shipping and time.

Accordingly, it would be advantageous to provide a system and method of identifying side-by-side and/or overlapped parcel conditions to eliminate as many erroneous delivery situations as possible. Advantageously, such a system would be automated such that the majority of parcel overlap conditions can be automatically detected without human intervention. Preferably, such a system would utilize machine vision cameras, illumination systems, machine vision processors (computers) and innovative image processing techniques to detect multiple object conditions, such as side-by-side and overlap parcels on a package conveyor.

SUMMARY OF THE INVENTION

The present invention provides a system and method for detecting the above specified multiple object conditions, such as side-by-side and overlapped packages on a package conveyor. The system includes at least one machine vision system including at least one machine vision camera, such as a CCD camera, at least one illumination subsystem and at least one machine vision computer. The illumination subsystem(s) is configured to illuminate a plurality of parcels as they are conveyed past a machine vision camera's field of view at an inspection station along a conveyor belt.

Each machine vision camera is positioned to capture one or more images of the parcels as the parcels are conveyed past the field of view. Each machine vision computer is programmed to detect the presence of multiple object conditions by detecting and counting the number of edges appearing in an image of a parcel captured by one of the machine vision cameras.

The present invention also provides a novel method of detecting the presence of multiple object conditions, such as side-by-side and overlapped parcels on a conveyor belt conveying a plurality of parcels past an inspection station. The method utilizes a machine vision system having at least one machine vision camera to capture images of a field of view, at least one illumination subsystem for illuminating the parcels as they are conveyed through the field of view on the conveyor belt and a machine vision computer for analyzing the captured images. The method of the present invention begins by illuminating at least one parcel as it passes through the field of view. While the parcel(s) is illuminated, at least one image of the parcel is captured by at least one of the machine vision cameras.

Blob processing is performed on the captured top view image. A side-by-side condition is detected by counting the number of distinctively separated parcels. The blob processing is implemented with a size filter to eliminate any objects smaller than a specified parcel size limit, for example a 2-inch by 2-inch area. If there is more than one parcel that exceeds the parcel size limit, a side-by-side condition is asserted. In addition, soft packages are manifested by their irregular blob patterns and hence will have a larger edge blob size threshold used in subsequent analyses. A different edge blob size threshold is needed to correctly delineate soft packages since small perturbations can be interpreted to be an overlap condition.

Each captured image is processed using the machine vision computer by first windowing each parcel using a Region of Interest (ROI). The processing continues by counting the number of edges appearing in the ROI. The presence of other than a single parcel condition is determined if the number of edges exceeds four.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
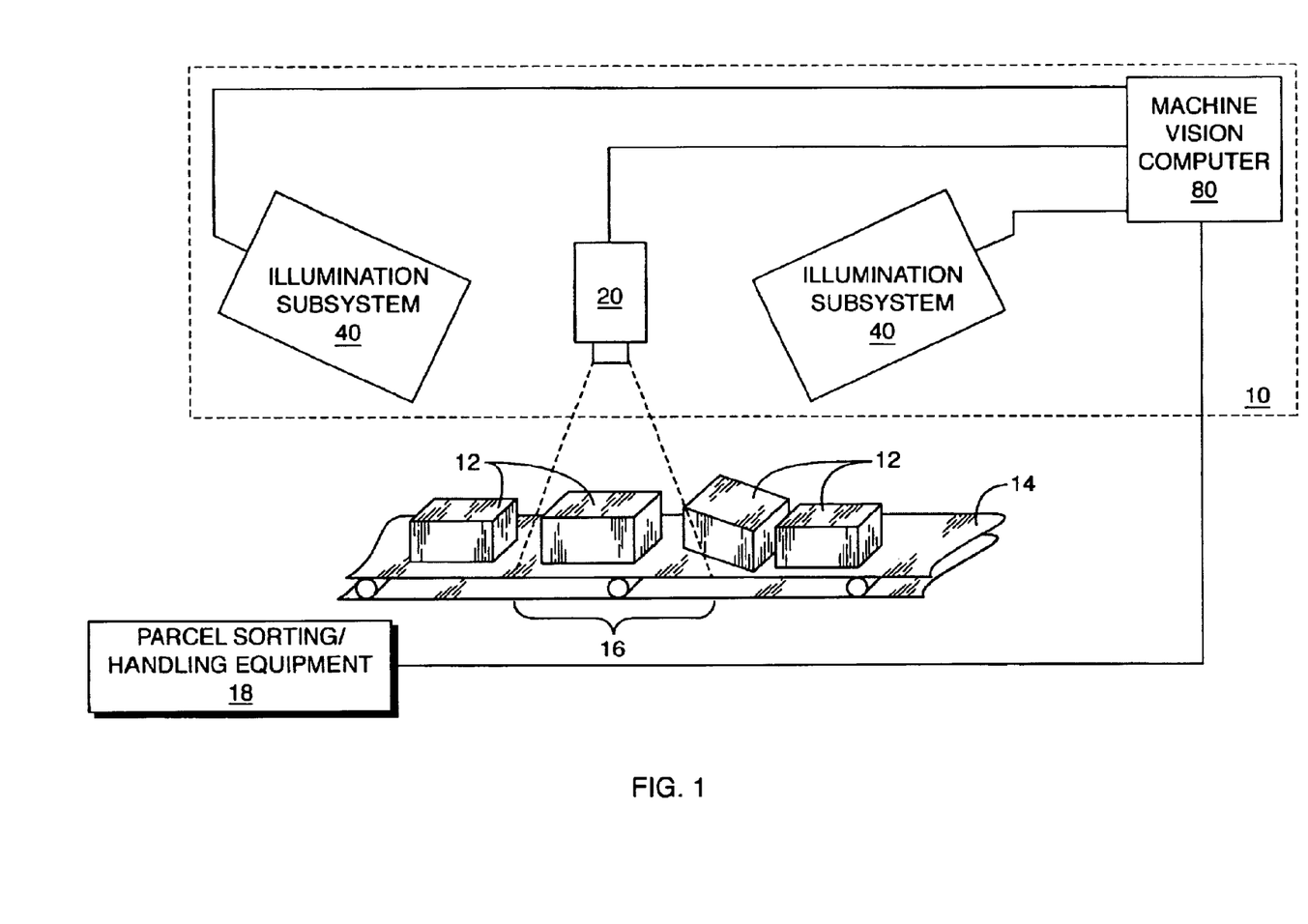
FIG. 1 is a block diagram showing the exemplary components of a system for detecting multiple parcel conditions according to the present invention.

Turning now to the figures, and, in particular, FIG. 1, a system 10 for detecting multiple object conditions, such as side-by-side and overlapped parcels or packages on a package conveyor, is shown. Although the present invention is explained in the context of package inspection, other inspection situations can also benefit from and utilize the teachings of the present invention and are considered to be within the scope of the present invention.

The system 10 is configured to detect the presence of a variety of parcel conditions as parcels 12 are conveyed on a package conveyor 14 past an inspection station 16. The system 10 includes at least one machine vision camera 20, an illumination subsystem 40 and at least one machine vision computer 80. The system 10 interfaces with parcel sorting/handling equipment 18 via the machine vision computer 80.

Figure 2:
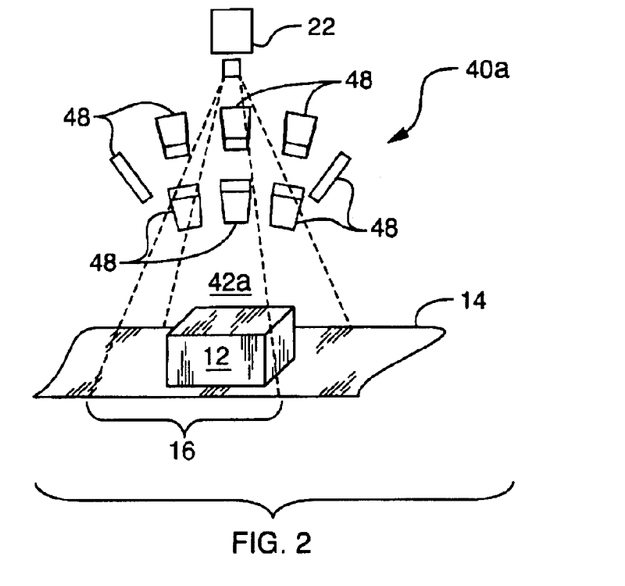
FIG. 2 is schematic diagram of a first illumination subsystem for illuminating parcels on a conveyor in a vertical direction.
Figure 3:
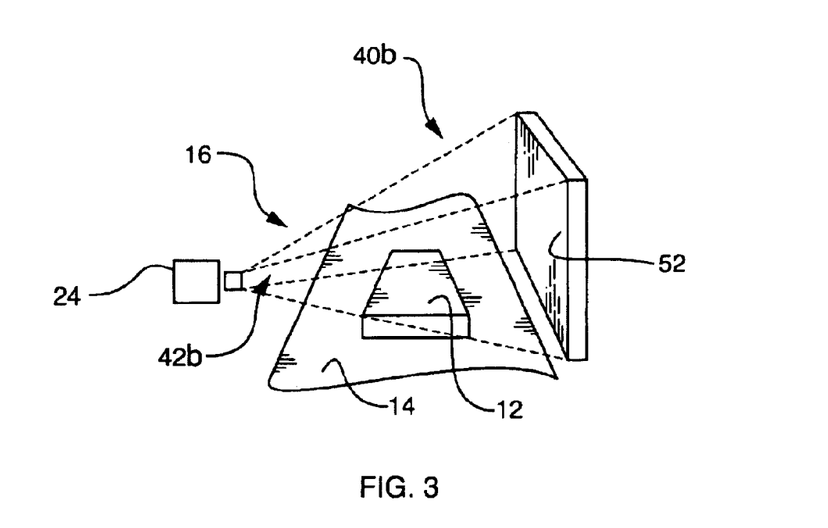
FIG. 3 is a schematic diagram of a second illumination subsystem, for back lighting parcels on a conveyor in a horizontal direction.
Figure 4:
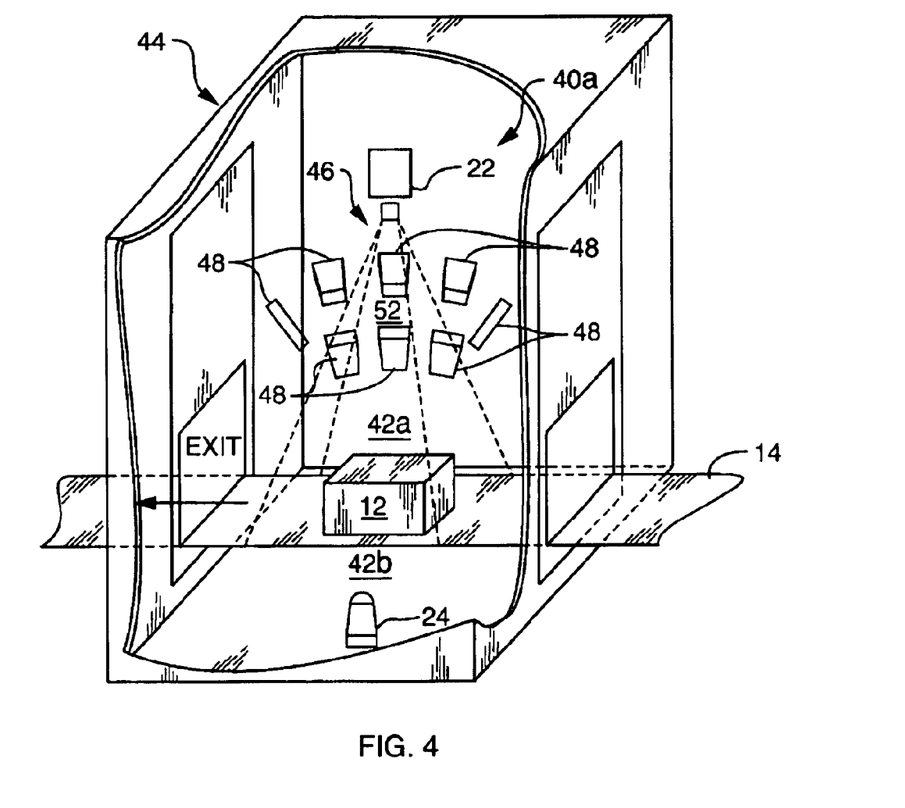
FIG. 4 is a schematic diagram of a cut-away perspective view of an inspection station including a combination of the illumination subsystems of FIGS. 1 and 2 and corresponding horizontal and vertical machine vision cameras.

The components of one embodiment of an illumination subsystem 40 are shown in more detail in FIGS. 2 through 5. The illumination subsystem 40 is configured to illuminate the parcels as they are conveyed past a field of view 42 at inspection station 16 (FIG. 1). In one embodiment, the field of view 42 is enclosed within a dark housing 44 (FIG. 4). In addition, in this embodiment, two views of the parcels being conveyed past the inspection station are inspected simultaneously by the system 10. A first view is captured by a vertical or top-mounted camera 22, FIG. 2, which captures a vertical image of at least one parcel as it is conveyed past the inspection station. A second view is captured by a horizontally mounted camera 24, FIG. 3.

The first or top view is imaged while the field of view 42a is illuminated using a first illumination subsystem 40a. The first illumination subsystem 40a is disposed intermediate the top view camera 22 and a parcel 12 being inspected as it passes through the first field of view 42a. One aspect of the first illumination subsystem 40a is to make the surface of any object passing within the field of view 42a to appear substantially light against a substantially dark background.

In one embodiment, the first illumination subsystem 40a is comprised of a plurality of strobes 48, such as xenon strobes, placed substantially halfway or partway between the first machine vision camera 22 and parcel 12. Each strobe 48 is disposed at an angle which his selected to enhance the illumination of the surfaces of parcels 12 being conveyed through the inspection station 16 and not the conveyor belt 14 which serves as the substantially dark background. In an alternative embodiment, an electronic shutter may be used on camera 22 in place of strobes 48.

In this embodiment, the second illumination subsystem 40b is configured to provide a back light against which images of packages 12 are captured as the packages 12 are conveyed past a second camera 24 having a second field of view 42b, which coincides with the second illumination subsystem 40b. In this manner, a second camera 24 captures a side view or horizontally disposed image of the package 12. In one embodiment, the second illumination subsystem comprises a light emitting diode (LED) array 52. In another embodiment, a camera filter, sensitive to a particular bandwidth, may be placed on second camera 24 for use with corresponding lights of a particular bandwidth.

Figure 5:
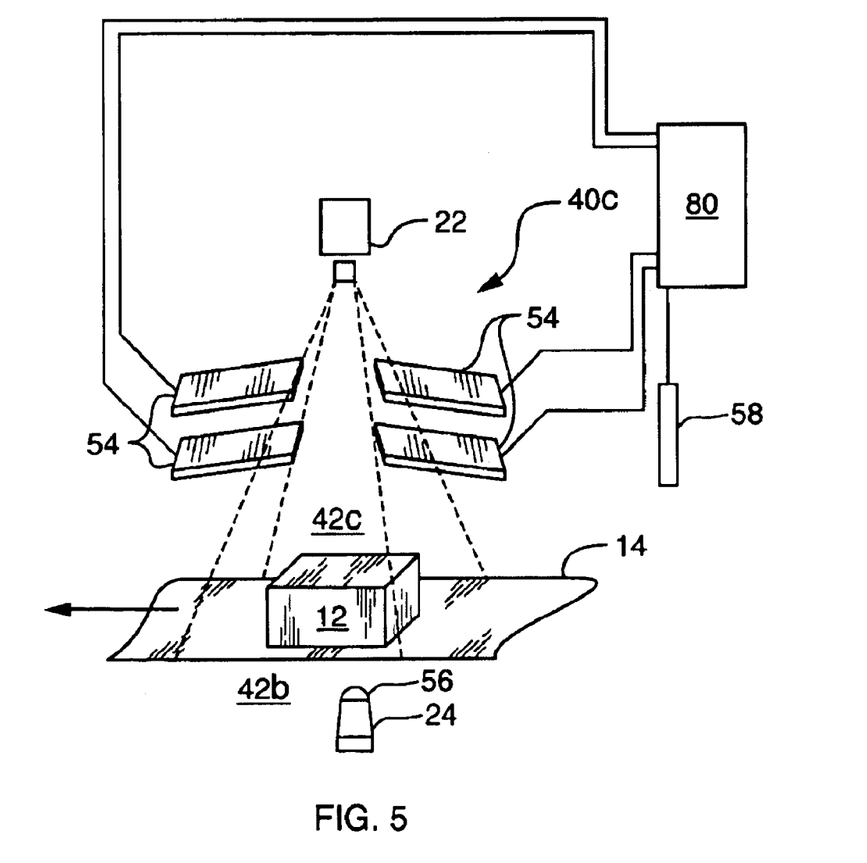
FIG. 5 is a schematic perspective view of an inspection station including an alternative illumination subsystem and corresponding horizontal and vertical machine vision cameras.

The components of another embodiment of an illumination subsystem 40 are shown in more detail in FIG. 5. The illumination subsystem 40 is configured to illuminate the parcels as they are conveyed past a field of view 42c at inspection station 16 (FIG. 1). In this embodiment, two views of the parcels being conveyed past the inspection station are also inspected simultaneously by the system 10. A first view is captured by a vertical or top-mounted camera 22 that captures a vertical image of at least one parcel as it is conveyed past the inspection station. A second view is captured by a horizontally mounted camera such as camera 24, FIG. 3.

The top view is imaged while the field of view 42c is illuminated using a first illumination subsystem 40c. The first illumination subsystem 40c is disposed intermediate the top view camera 22 and a parcel 12 being inspected as it passes through the first field of view 42c. In this embodiment, the components of the illumination subsystem 40c prevent interference from other lighting systems and ambient light.

The first illumination subsystem 40c includes a plurality of generally high intensity lights 54, such as constant source sodium vapor lights, placed substantially halfway between the first machine vision camera 22 and parcel 12. The intensity of the lights 54 is selected to overcome ambient light that may be present. Each light 54 is disposed in about the same plane as the camera 22 with a slight angle of 10–15 degrees, which may be adjusted to enhance the illumination of the surfaces of parcels 12 being conveyed through the inspection station 16 and not the conveyor belt 14 that serves as a substantially dark background for the packages.

In this embodiment, the illumination subsystem 40c may be controlled by a feedback mechanism with a photodiode 58 connected to machine vision computer 80 reading the light level to automatically monitor and adjust the light level. In addition, the camera may include a shutter 56 instead of the use of strobes. Alternative and equivalent back lighting systems are available and considered to be within the scope of the present invention.

Utilizing the system of FIGS. 1 through 5, the present invention provides a novel method for detecting the presence of multiple parcel conditions as parcels are conveyed past an inspection station by a conveyor belt. In simple terms, the method comprises counting the number of edges appearing in an image. If the number of edges appearing exceed a total of four, then there is a high probability that the image contains more than one package.

The method begins by illuminating at least one parcel as it passes through a field of view at a parcel inspection station along a conveyor belt. As each parcel is illuminated, at least one image of the parcel is captured using at least one machine vision camera. Each captured image is then processed by a machine vision computer to analyze each image and detect the presence of other than a single parcel appearing in the image.

In order to facilitate the processing act, the machine vision computer 80 includes image data processing software which generates at least one Region of Interest (ROI), which is utilized to window the object(s) under inspection in each image. This allows for faster subsequent processing and also prevents false edge detection outside of an object boundary. An example of an ROI is shown in the FIG. 6 wherein a substantially off axis oriented carton 12 is windowed within ROI 102. The ROI is also used to adjust the threshold edges to be included in the edge counting process. If the edge size exceeds the threshold derived from the boundary size, then the edge is counted.

The object(s) appearing in each image are then preliminarily analyzed to determine if the object(s) is other than a carton. For example, polyethylene or paper bags have irregular shapes and are not geometrically well defined. Therefore, by counting the "blob" and "hole" results from a connectivity analysis, which is a technique well known in the art, a parcel can be classified as either a carton or other parcel.

On the other hand, cartons and boxes are types of parcels with well-defined geometric shapes. These shapes include squares, rectangles, circles, and symmetrical polygons, such as parallelograms, trapezoids, and octagonal shapes.

If an object is classified as a parcel other than a carton, then additional image processing techniques or even human intervention will be employed. However, if an object is classified as a carton, a hole closing technique is employed to make the carton appear uniformly light. Any artifacts, such as graphics, wrappers, tape and the like, that are not light-saturated will be closed by a grayscale morphological technique, which essentially entails filling dark holes created by the artifact(s) with white pixels so that they will not manifest themselves as edge blobs in the edge detection process.

Following the carton identification and hole filling steps, an edge detection process, as more fully explained below, will be performed to determine if a multiple object condition exists.

Since edge detection performs best when edges are presented in an orientation normal to a gradient, a concept known to those skilled in the art as gradient steering is employed in order to select an image that provides the best outline of an object. With gradient steering, a gradient angle of each parcel as it appears in the first image is determined and, depending on the angle of the object, either a horizontal or vertical edge detector is chosen to obtain the best outline of the object. Of course, for some images, both vertical and horizontal edge detection will provide similar results, accordingly, in such cases, edge detection is performed in both the horizontal and vertical direction.

Figures 6, 7A:
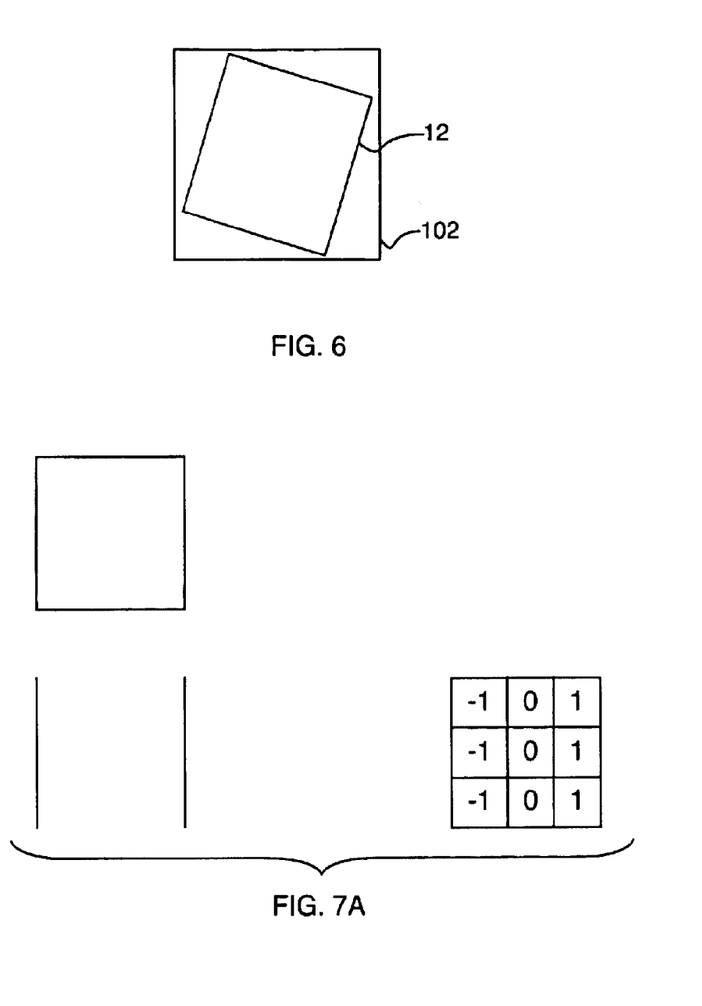
FIG. 6 is a schematic illustration of an example of a bounding box used to window a parcel under inspection.
FIG. 7A is a schematic diagram of a vertical edge detector kernel which is useful for analyzing cartons that are oriented substantially vertically.
Figure 7B:
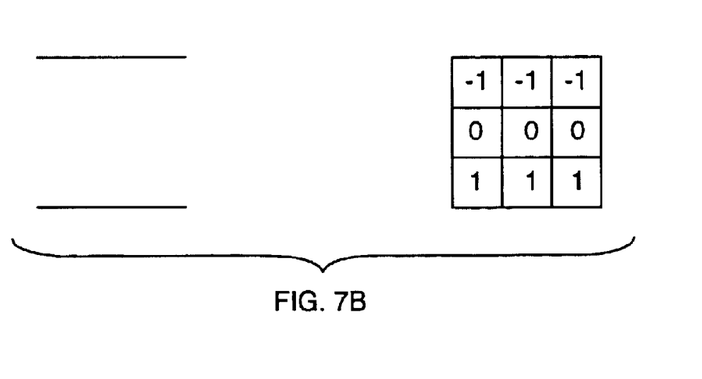
FIG. 7B is a schematic diagram of a horizontal edge detector kernel configured to analyze cartons that are oriented substantially horizontally.

In one embodiment of the invention, a linear delineation process is used wherein an object is identified to be primarily a carton. Such a process utilizes a steerable outline edge detection step, performed on each windowed object image using the gradient angle derived from the gradient angle determination step. The steerable outline edge detection step utilizes one of two forms of edge calculation, depending on the orientation of the carton. If the orientation of the carton is almost vertical or horizontal, then the steerable outline edge detection will apply a horizontal kernel and a vertical kernel to the windowed images to emphasize the edge contents within the image. This edge detection can further be enhanced by applying proper gain and offset to the calculation. FIGS. 7A and 7B provide an example of vertical and horizontal kernels applied to an edge detector analyzing an image of a substantially horizontal/vertical carton. Applying such an edge detector will emphasize the edge contents while suppressing spurious noise.

Vertical and horizontal edge detectors can be used provided the carton is aligned with the horizontal and vertical axes, plus or minus 15 degrees. In other words if the gradient angle is between 0 degrees and 15 degrees or is between 75 degrees and 90 degrees, then the vertical and horizontal gradient detectors will be utilized.

Figure 8A:
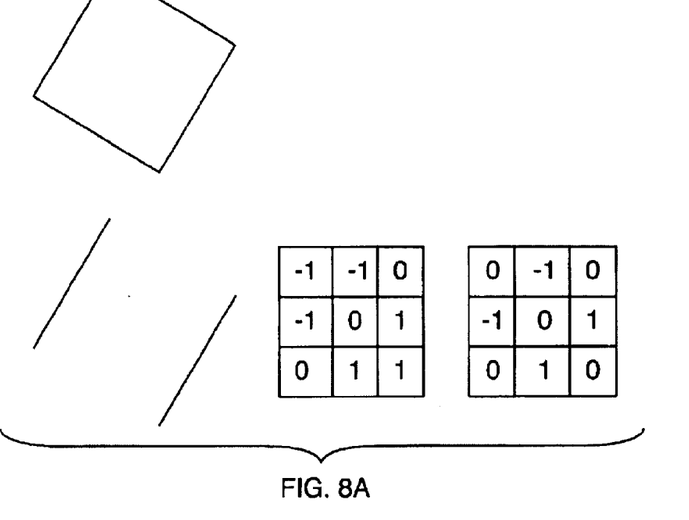
FIG. 8A is a schematic diagram illustrating a double kernel edge detector, including a steerable double vertical edge kernel for analyzing substantially vertically directed edges of an orthogonally oriented parcel.
Figure 8B:
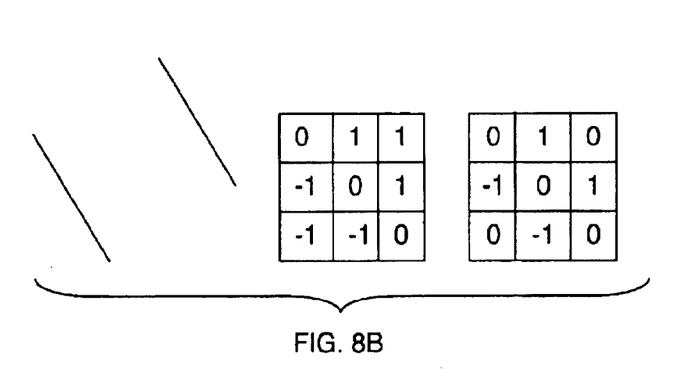
FIG. 8B is schematic diagram of an edge detector including a steerable double horizontal edge kernel for analyzing substantially horizontally directed edges of an orthogonally oriented parcel.

However, the steerable horizontal and vertical edge detectors cannot be effectively used for substantially off axis oriented cartons, which are cartons having a gradient angle falling between 15 degrees and 75 degrees. Therefore, if a carton is identified as having gradient angles which place the parcel in other than a substantially vertical or a substantially horizontal position, then a special outline edge detector, such as a steerable, double kernel edge detector, must be employed to emphasize the orthogonal edges of the carton. Such a double kernel edge detector must be optimized for angles other than substantially vertical or substantially horizontal. A substantially off-axis oriented carton and a steerable double kernel edge detector are shown in FIGS. 8A and 8B. As can be seen, the double kernel edge detector applies a steerable double vertical edge kernel to emphasize the substantially vertically oriented edges and a steerable double horizontal edge kernel to emphasize the substantially horizontally oriented edges. Thus, the double kernel edge detection process resolves random orientation of parcels.

The 15-degree threshold is derived from the minimum tolerable errors introduced when part of the boundary features are not orthogonal to the gradient detectors. A minimum feature of 2 inches*sin(15 degrees)=0.5 inches is the absolute minimum acceptable error. In other words, if a perfect square object aligned perfectly to the Cartesian coordinate, the error is zero. However, as the object rotates toward the 15-degree limit, the error gets bigger (losing some edge information) until it is not tolerable using the vertical and horizontal gradient detectors. Accordingly orthogonal gradient detectors must be used to minimize the errors.

The next step in the method resolves the irregular nature of parcels. Some parcels are not perfectly square, rectangular or circular. They include dents, frayed edges, bands, tapes and various artifacts associated with random packaging, handling and transport. Therefore, the results from the outline edge detection process cannot be guaranteed to provide clean and separable outlines. Thus, there are occasions in which smaller artifacts appear as blobs or are stacked on top of one another and are therefore falsely counted. There are also cases when one or more edges of a parcel are broken up due to weak contrast (reflectivity). Accordingly, the disclosed method provides a process designed to sort and eliminate false edge blobs.

Figure 9:
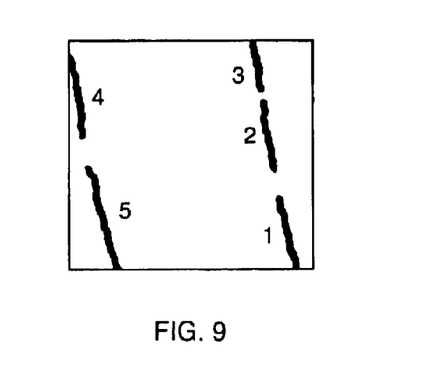
FIG. 9 is a schematic diagram illustrating a Region of Interest (ROI) including a plurality of image blobs, which are utilized to perform edge blob sortation according to one embodiment of the present invention.

This process is called "edge blob sortation" and uses the same bounding box provided in the initial connectivity analysis step, wherein each object is windowed or encompassed within a bounding box. Edge blob sortation identifies, orders, and analyzes edge blobs as follows: first, a blob list, including each identified blob is sorted according to proximity to a root blob. A root blob is a blob that is closest to one corner of the bounding box. All of the blobs are then ordered depending on their proximity to the root blob. For example, the second blob on the list is the blob closest to the root blob. Then, a third blob is identified as the blob closest to the second blob. The process continues recursively until each blob on the blob list is labeled. FIG. 9 shows an ROI including five edge blobs. Edge blob 1 is the closest to the bounding box corner, and edge blobs 2, 3, 4, and 5 are ordered depending on their proximity to the root blob and the other blobs.

The edge blob sortation continues by eliminating blobs utilizing co-linearity and proximity checks. For example, if two blobs are too close to each other, then a proximity check will eliminate the second blob by distance. If two blobs form a two segment straight line, then a co-linearity check will eliminate the second blob by enclosed angle (angle between the two blobs) value. The edge blob sortation step continues through the entire sorted blob list and eliminates all the redundant and false edge blobs for both vertical and horizontal outlines of a parcel. The edge blob sortation step also checks to see if each blob on the list meets certain qualifications, such as elongation, length to width ratio, and ratio of the area of the parcel to its perimeter.

Figure 10:
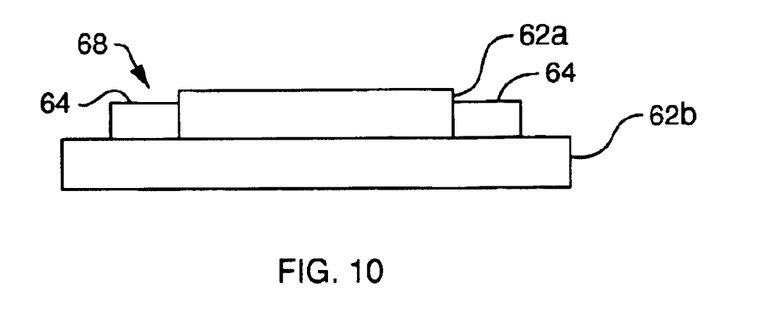
FIG. 10 is a schematic diagram illustrating a corner blob indicative of an overlapped or piggy back situation.
Figure 11:
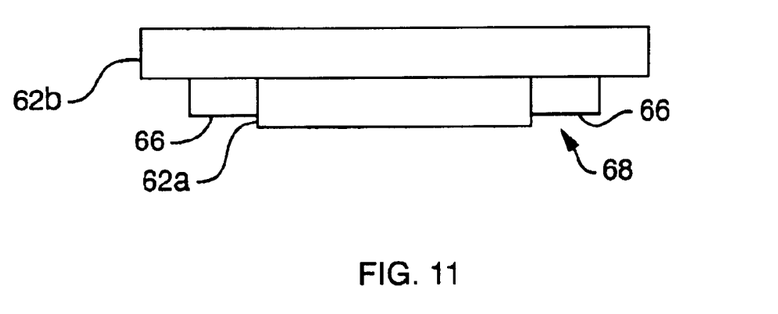
FIG. 11 is a schematic diagram illustrating an overhang blob indicative of an overlapped or piggyback package situation.

In addition, the algorithmic processing of the present invention can also detect piggy backed and overlapped parcels 62, FIGS. 10 and 11. The algorithm detects these situations by performing corner blob 64 and overhang blob 66 checks. These checks are performed by drawing a recessed bounding box 68 around the parcels. A connectivity algorithm is employed to find two white blobs 64/66. If there is one or more white blob, a piggyback (FIG. 10), overlapped or multiple parcel condition (FIG. 11) is detected.

After blob elimination, the method continues by counting the remaining blobs. A blob count of more than two is indicative of a multiple parcel condition. A count of two or less in each of the directions will result in further analysis of the object by performing edge delineation and edge blob sortation on the image captured by the second camera.

Accordingly, a new and useful system and method for detecting the presence of multiple parcel conditions as parcels are conveyed on a conveyor system is provided.

Modifications and substitutions by one of ordinary skill in the art are considered to be within the scope of the present invention which is not to be limited except by the claims which follow.

What is claimed is:

1. A system for detecting the presence of overlapped objects on a conveyor belt conveying a plurality of objects, said system comprising:

at least one machine vision system including first and second machine vision cameras, first and second illumination sources, and at least one machine vision computer;

said first and second illumination sources configured to illuminate said plurality of objects as said objects are conveyed past a field of view at an inspection station along said conveyor belt, wherein said first illumination source illuminates said objects in a vertical direction and said second illumination source illuminates said objects in a horizontal direction, and wherein said first illumination source includes a lighting system configured to make said objects appear light against a substantially dark background, and said second illuminating source includes a lighting system configured to make a background light against said objects;

said first and second machine vision cameras positioned to capture images of said plurality of objects as said objects are conveyed past said field of view, and wherein said first machine vision camera is oriented to capture a first image of said objects in said field of view in the vertical direction, and said second machine vision camera oriented to capture a second image of said objects in said field of view in the horizontal direction;

said at least one machine vision computer programmed to detect the presence of multiple object conditions by detecting and counting a number of edges appearing in an image captured by said first or second machine vision camera; and said at least one machine vision computer, for performing edge blob sortation on the image captured by said first or second machine vision camera.

2. The system of claim 1, wherein said first lighting source includes at least one angled strobe light oriented on a side of said objects coinciding with said first machine vision camera.

3. The system of claim 2, wherein said at least one angled strobe includes a xenon strobe.

4. The system of claim 1 wherein said first lighting source includes at least one high intensity light adjustably disposed in approximately the same plane as said first machine vision camera.

5. The system of claim 4 wherein said at least one high intensity light is a sodium vapor light.

6. The system of claim 4 further comprising a photodiode connected to said first lighting source, for controlling the intensity of said high intensity light.

7. The system of claim 1, wherein the back light of the second lighting source is oriented on a side of said parcels opposite said second machine vision camera.

8. The system of claim 7, wherein said back light includes an LED (light emitting diode) array.

9. The system of claim 7, wherein said at least one machine vision camera includes a filter sensitive to a bandwidth of said second lighting source.

10. The system of claim 1 wherein said objects being conveyed and detected include packages.

11. The system of claim 1, further including vertical and horizontal edge detectors, for detecting objects aligned within 15 degrees from a vertical axis and a horizontal axis, and further including a special outline detector, for detecting objects aligned between 15 degrees and 75 degrees from the vertical axis and the horizontal axis.

12. The system according to claim 1, wherein said second lighting source includes a light emitting diode array.

13. A system for detecting the presence of overlapped parcels on a conveyor belt conveying a plurality of parcels, said system comprising:

at least one machine vision system including at least one machine vision camera, first and second illumination sources and at least one machine vision computer;

said first and second illumination sources configured to illuminate said plurality of parcels as said parcels are conveyed past a field of view at an inspection station along said conveyor belt, and wherein said first illumination source includes a lighting system configured to make said objects appear light against a substantially dark background, and said second illuminating source includes a lighting system configured to make a background light against said objects;

wherein said at least one machine vision camera includes first and second cameras, said first machine vision camera oriented to capture a first image of said parcels in said field of view in a vertical direction as said parcels are conveyed past said field of view, and said second machine vision camera oriented to capture a second image of said parcels in said field of view in a horizontal direction as said parcels are conveyed past said field of view;

said at least one machine vision computer programmed to detect the presence of multiple parcel conditions by detecting and counting a number of edges appearing in an image of said parcels captured by said first or second machine vision camera; and said at least one machine vision computer, for performing edge blob sortation on the image of said parcel captured by said first or second machine vision camera.

14. The system of claim 13, further including vertical and horizontal edge detectors, for detecting objects aligned within 15 degrees from a vertical axis and a horizontal axis, and further including a special outline detector, for detecting objects aligned between 15 degrees and 75 degrees from the vertical axis and the horizontal axis.

* * * * *